UNITED STATES PATENT OFFICE.

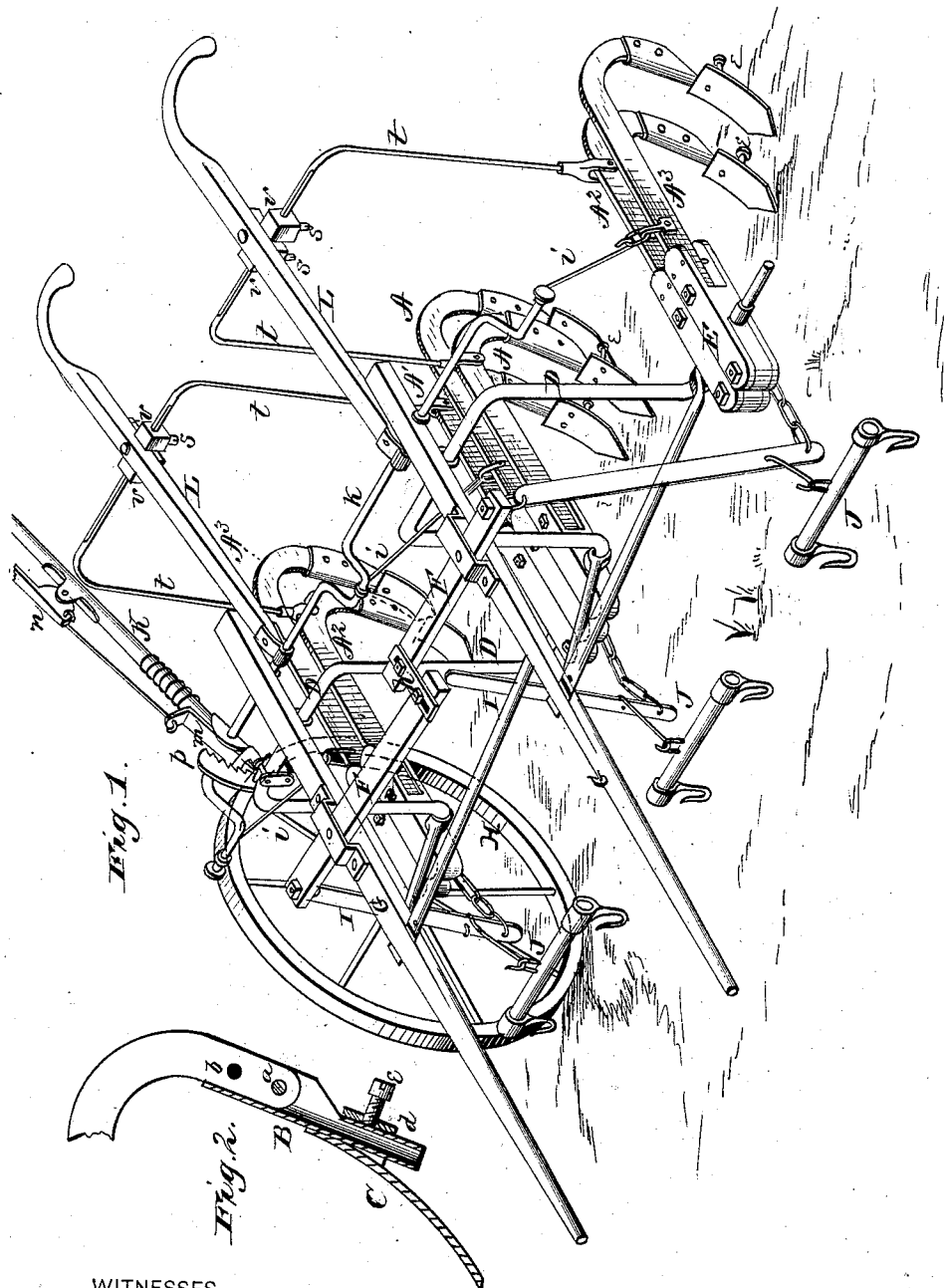

GEORGE HAMMANS, OF GOSPORT, IOWA.

IMPROVEMENT IN CULTIVATORS.

Specification forming part of Letters Patent No. 221,058, dated October 28, 1879; application filed June 16, 1879.

*To all whom it may concern:*

Be it known that I, GEORGE HAMMANS, of Gosport, in the county of Marion, and in the State of Iowa, have invented certain new and useful Improvements in Cultivators; and I do hereby declare that the following is a full, clear, and exact description thereof, reference being had to the accompanying drawings, and to the letters of reference marked thereon, making a part of this specification.

The nature of my invention consists in the construction and arrangement of a three-horse cultivator, as will be hereinafter more fully set forth.

In order to enable others skilled in the art to which my invention appertains to make and use the same, I will now proceed to describe its construction and operation, referring to the annexed drawings, in which—

Figure 1 is a perspective view of my improved cultivator. Fig. 2 is a detailed view of a part thereof.

In my cultivator are seven plow-beams, arranged three in the center and two on each side near the wheels, the said plow-beams being marked as follows: the one in the center, A, and the one close on each side thereof, A', and those near the wheels are marked, the inside one, $A^2$, and the outside one, $A^3$.

Each plow-beam has on its lower end a sheath, B, pivoted at $a$, and held in place by a break-pin, $b$. The lower end of the sheath is passed through a loop or socket, $d$, formed on the back of the plow C, the same being then fastened to the sheath by a set-screw, $e$, as shown in Fig. 2. The plow can thus be adjusted up or down on the sheath, and turned more or less to either side, as may be required.

The various plow-beams are connected to the main axle D by couplings E E, which are made adjustable on the axle, so that the distance between the plows can be increased or diminished at will by simply shifting pins in corresponding holes in the main axle. The main axle D is formed, as it were, with three cranks, the three center plows being on the middle crank, and two side plows on each end crank. H H are the wheels on the ends of the axle.

The plow-beams A and $A^3$ $A^3$ are made adjustable by setting tempering-pins into the couplings to turn each beam into the required position for working them.

For the purpose of equalizing the draft on the horses I make the double-tree in two pieces, F F, pivoted on the poles G G, and their inner ends adjustably connected by a slotted link, $h$. From the center and ends of this divided double-tree depend arms or rods I, having their lower ends connected by chain-links with the cranks of the axle; and the single-trees J are also connected to said arms or rods I.

By making the double-tree in two pieces it gives the middle horse, working between the poles G G of the machine, the same draft as each of the side horses; and by connecting the two parts of the double-tree with the link $h$ it permits of shifting each half according to the position of each horse.

In arranging the neck-yoke the same principle should be applied, and by these means a full adjustment of the power of each horse is secured.

For the purpose of raising the center beam, A, and outside beams, $A^3$, I affix to the end of and across each pole, back of the main axle, an iron shaft, $k$, bent to form three cranks, from which rods $i$ connect with said plow-beams; and to this shaft is secured a lever, K, with a suitable stop, $n$, worked by a short lever or finger-piece, $m$, and taking into a rack, $p$, on the main axle. By these means the operator is enabled to keep these plows up out of the ground independent of the other four plows.

To adjust the distance between the two plow-beams A' and $A^2$ on each half of the machine, I make the bent iron rod, which connects them in two parts, $t$ $t$, and their inner ends are fastened by means of two sockets, $v$, with set-screws $s$, one of said sockets being fastened to each side of the handle L, which is used to shift the plows from side to side during plowing. The handles are connected to the triple crank-shaft $k$ as shown.

Having thus fully described my invention, what I claim as new, and desire to secure by Letters Patent, is—

1. The combination, in a three-horse cultivator, of the double-tree made in two parts, F F, pivoted on the poles G G, and their inner ends connected by the link $h$, the arms or rods I I I, and single-trees J J J, all substantially as and for the purposes herein set forth.

2. The combination, in a cultivator, of the plow-beams A $A^3$ $A^3$, rods $i$, and triple crank-shaft $k$, and the plow-beams A' A' and $A^2$ $A^2$, and the divided rods $t\,t$, with separate handles L L, having sockets $v\,v$ for adjusting the divided rods, whereby the center beam, A, and outside beams, $A^3$ $A^3$, may be raised and lowered independently of the beams A' A' and $A^2$ $A^2$, and vice versa, substantially as herein set forth.

In testimony that I claim the foregoing I have hereunto set my hand this 25th day of April, 1879.

GEORGE HAMMANS.

Witnesses:
GEORGE R. DANSON,
WILLIAM A. WHITLATCH.